United States Patent
Odell

[15] 3,693,458
[45] Sept. 26, 1972

[54] RESIN FLOW TEST APPARATUS AND METHOD

[72] Inventor: Norman F. Odell, Crystal Lake, Ill.

[73] Assignee: Morton International, Inc., Chicago, Ill.

[22] Filed: Sept. 30, 1970

[21] Appl. No.: 76,810

[52] U.S. Cl. .................73/432 R, 73/15 R, 73/56
[51] Int. Cl. .............................................G01n 11/04
[58] Field of Search.......73/53, 56, 150, 15.6, 432 R; 18/12 B, DIG. 49

[56] References Cited

UNITED STATES PATENTS

| | | |
|---|---|---|
| 2,699,002 | 1/1955 | DiSylvestro...........73/432 R X |
| 2,395,254 | 2/1946 | Currie.....................73/432 R |
| 2,660,051 | 11/1953 | Dowling....................73/150 X |

Primary Examiner—Louis R. Prince
Assistant Examiner—Joseph W. Roskos
Attorney—Jack Axelrood

[57] ABSTRACT

An apparatus and method for testing the performance of a thermo-setting resinous composition said apparatus comprising two cooperatively engageable sections, one of said sections having a series of depressions terminating in an exit gate thereby providing voids which when filled with a pressure injected resinous material cause said resinous material to be extruded in a ribbon from said exit gate.

9 Claims, 7 Drawing Figures

INVENTOR
NORMAN F. ODELL

RESIN FLOW TEST APPARATUS AND METHOD

BACKGROUND OF THE INVENTION

The molding techniques generally employed with thermosetting resins include compression molding and transfer molding. Compression molding involves placing directly into the mold cavity the molding compound which is fluidized and forced into the desired shape as the mold closes. Transfer molding involves placing the molding compound into a separate transfer pot or chamber and, by means of a transfer plunger, forcing it to flow into the mold cavities.

The present invention relates to a transfer mold and method for testing the qualities of resinous materials, for example, epoxy resins, conventionally used in transfer molds. In the manufacture of epoxy materials, minor variations in formulation or quality of the ingredients can affect certain qualities of such epoxy materials. Among those qualities are cure time, optimum time for heating prior to injection, speed with which the material should be injected, size of a mold which can be properly filled, integrity of the molding material both during and after molding and optimum time to remove molded material from a mold. To evaluate these various qualities of epoxy materials both during the manufacturing process and immediately prior to use, a convenient testing operation is needed. Electrical and other physical properties of components made with molding material are dependent upon conditions of molding. The optimum conditions can be predicted by using information about the various qualities of molding material obtained from the invented test.

PRIOR ART

One of the best known testing mechanisms in this field is the "spiral flow test". In the spiral flow test a molding compound is fed through a gate into a spiral shaped cavity at 300±5° F. with a pressure of 500 p.s.i. calculated on the plunger area. The distance the compound flows into the spiral mold is measured in inches. The distance of flow, i.e., inches, is a function principally of the viscosity of the compound when melted and of the speed of its gelation. Conventional molds have a runner or trough-like cavity leading from the feed aperture to a gate which gate communicates with the main molding cavity. A spiral flow test mold comprises the equivalent of a spiral runner and has no equivalent of a mold cavity. Accordingly, the flowing tip of molding material in a spiral flow mold does not have the same flow characteristics as it does in conventional molds. The excessive length of the runner and the varying radius of the spiral are two reasons for the difference in the flow characteristics of a spiral flow mold from that of conditions of actual use. Also, the spiral flow test fails to conveniently allow determination of optimum times for injection and curing of different epoxy molding materials. In addition, a spiral flow mold does not permit visual examination of the molding material during the time that it is being molded.

The viscosity of molding materials is also tested by the Brabender torque rheometer. The Brabender makes use of a variable speed dynamometer connected to a calibrated mixer-measuring head or extruder and records on the scale of a strip chart recorder. This device makes use of a damper for the dynamometer lever-arm system. The curve recorded by this system is not well defined (possibly a reflection of the use of a lever-arm with its attendant damper system) and it is thus difficult to interpret specific points on the curve. The Brabender technique has the additional disadvantages of being expensive and therefore not available at a majority of molding shops. More importantly, its testing procedure is not in any way comparable to actual molding conditions. Further, because it uses a high-shear mixer, the heat transfer during testing is not typical of molding practice heat transfer conditions.

Also used is the hot plate cure time test, sometimes known as the stroke test. A loosely specified amount of powdered molding material (approximately 5 to 6 grams) is placed on a hot plate having a predetermined surface temperature. The molding material is then stroked or worked with a spatula until it will not move any longer. The time for this operation is determined as the cure time for the tested molding material at the predetermined temperature. Factors such as quantity of material used, thickness of the layer of material and heat transmission through the compound, rigidity of the spatula employed, air currents over the test area, lack of precision temperature control, and judgment of the operators result in different results by different operators and therefore a lack of reliability for this test.

Accordingly, it is an object of the present invention to provide a convenient and economical apparatus and method for testing the performance of a thermo-setting resinous composition which apparatus and method simulate conventional molds and molding conditions used in industry.

It is another object of the present invention to provide an economical apparatus and method for testing the performance of a thermo-setting resinous composition which apparatus and method allow convenient measurement with respect to rate of flow, viscosity and cure characteristics of such compounds.

It is also an object of the present invention to provide an economical apparatus and method for testing the performance of a thermo-setting resinous composition which apparatus and method provide information to determine optimum time injection and optimum time for curing of specified molding materials.

It is another object of the present invention to provide an economical apparatus and method for testing the performance of a thermo-setting resinous composition which apparatus and method allow visual examination of the molding material while it is being molded.

SUMMARY OF THE INVENTION

The present invention comprises a mold apparatus and method for testing the performance of a thermo-setting resinous composition. The mold is used in conjunction with a standard transfer molding press having a heated reservoir and a means for controlling the pressure applied to its transfer plunger. The apparatus comprises at least two sections cooperatively engaged which sections are adapted to receive fluid resinous molding material through an aperture in one section and to permit said molding material to exit from a second section. The first section defines a flat surface portion with a pair of opposed sides extending downwardly therefrom, said flat surface having an aperture extending therethrough. Resinous material to be tested is introduced into the mold through its aperture or sprue. A second section defines a flat surface portion in which there are a series of depressions which, when said first and said second sections are cooperatively engaged, form cavities. These depressions include a trough-like runner at right angles to and communicating with said aperture, a shallow rectangular depression having two ends lying in the surface of said second section in a position normal to said runner, one end of said shallow rectangular depression communicating with said runner and the other end of said shallow rectangular depression communicating with a deep depression at right angles to said shallow rectangular depression, said deep depression extending through the depth of said second section. The deep depression narrows to define an exit gate having a gap of predetermined dimensions. When the sections of this apparatus are cooperatively engaged the depressions provide cavities or voids which when filled with a pressure injected thermosetting resinous composition, for example, an epoxy resin, permit said epoxy resin to exit from said exit gate in the form of a ribbon.

The invented method comprises heating resinous material to be tested to render it mobile, forcing it to flow in a stream through the cavities of the herein-described invented apparatus, extruding the material through the exit gate, recording the resin displacement per unit time and visually inspecting the tested material. Resinous material being tested, by being forced through the cavities of the invented apparatus, according to the present method, is subjected to conditions similar to the conditions of actual use in industrial molding operations. When flowing from the aperture to the runner, from the runner to the shallow rectangular depression, and again from the shallow rectangular depression to the deep depression and thence through the exit gate the resin is each time forced to flow in a path perpendicular to its former flow path. These changes in flow direction are typical of the flow paths encountered during normal industrial molding procedure. When the tested composition reaches the narrow exit gate it is extruded from the test apparatus and may be visually inspected to determine its physical integrity and the quantity of the material extruded. Recording the displacement of the resin per unit time as it flows through the apparatus allows a precise determination of pertinent information regarding the molding characteristics of the composition being tested, (see description of FIG. 6 below) and serves to predict accurately the resin performance characteristics under conditions of actual industrial use.

DESCRIPTION OF PREFERRED EMBODIMENT

Figure 1:
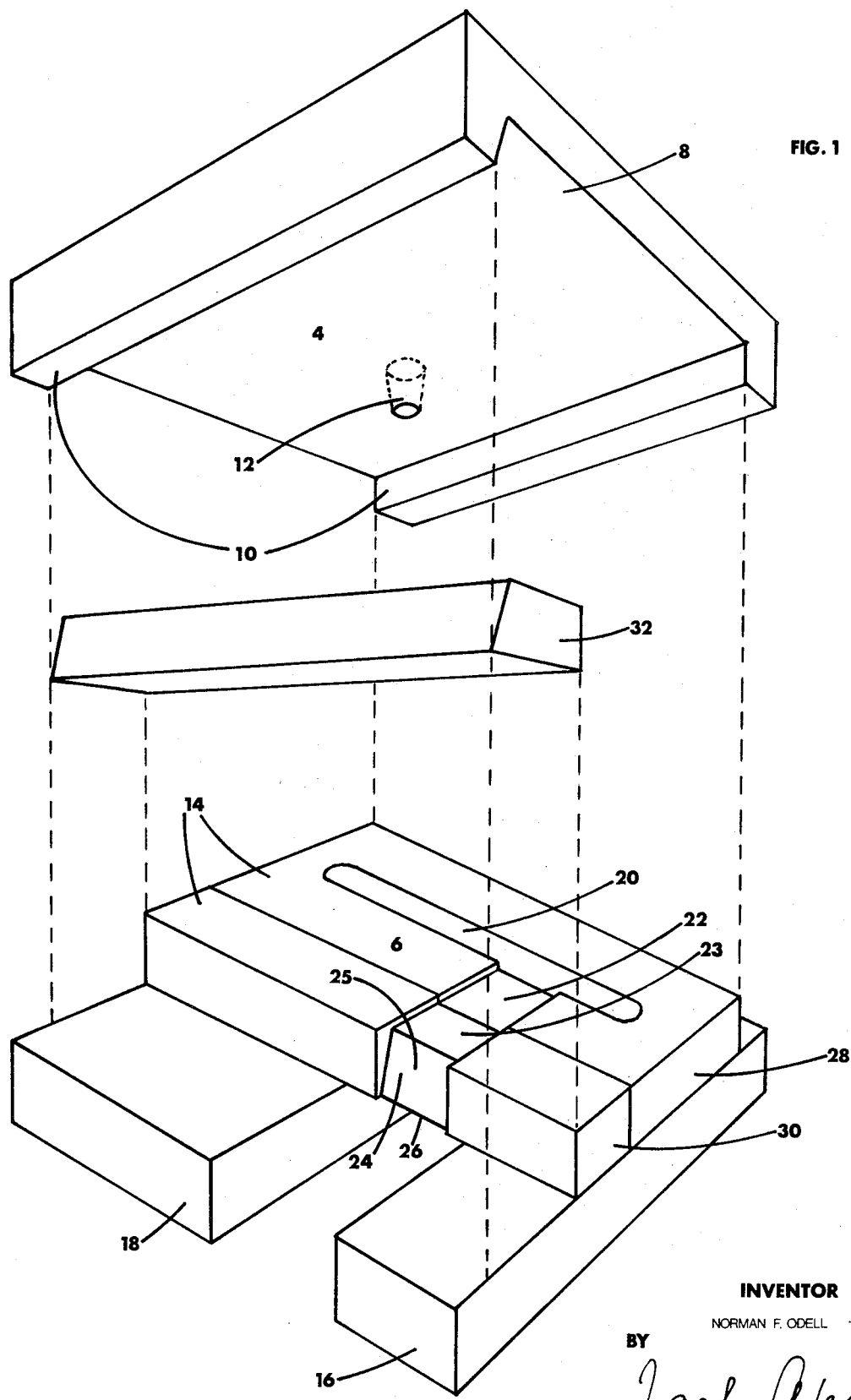
FIG. 1 shows a detailed isometric view of the apparatus used to test the qualities of resinous molding materials. The depressions of this particular embodiment of the apparatus are defined by blocks 28, 30 and 32.
Figure 2:
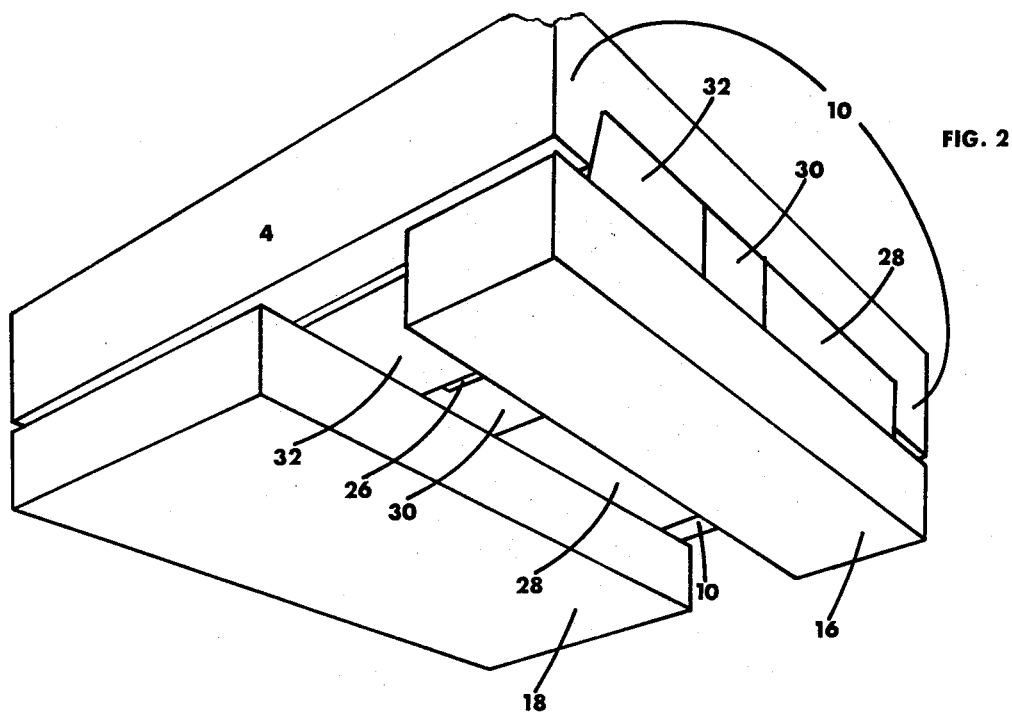
FIG. 2 shows a detailed perspective view from the base of the assembled apparatus of FIG. 1.

FIG. 1 represents one embodiment of the apparatus of this invention comprising a first section 4 and a second section 6. First section 4 defines a flat surface portion 8 with opposing sides 10 extending downwardly therefrom, said flat portion having aperture of sprue 12 extending therethrough. Second section 6 defines a flat surface portion 14 composed of blocks 28, 30 and 32 and in which there is a series of depressions. Surface 14 is cooperatively engageable with flat surface portion 8. For convenience second section 6 is constructed of several parts, i.e. supports 16 and 18 and blocks 28, 30 and 32. If it is desired, it is possible to construct section 6 of one block defining the same depression as blocks 28, 30 and 32 (see FIG. 4). Trough-like runner 20 lies on surface 14 and at a point intermediate its ends and in a position normal thereto communicates with depression 22. When section 4 is matingly engaged with section 6, sprue 12 is aligned perpendicular to and communicating with runner 20. Also on surface 14, depression 23, which lies on block 30, is contiguous or coextensive with depression 22 and communicates at right angles with depression 25 (see FIG. 4). Block 32, when placed into position with one face thereof against block 30 and opposed to sloping face 24, defines a depression which extends through the depth of section 6 and narrows to define exit gate 26 having a gap of predetermined dimensions. The portion of the second section 6 comprising surface 14 may be integrally constructed with supports 16 and 18 or may be mounted on separate supports 16 and 18, said supports being one on each side of gate 26 and defining a space therebetween.

First section 4 and second section 6 cooperatively engage so that surfaces 8 and 14 are in contact with each other. When so engaged, depressions 22, 23 and 25 (for depression 25 see FIG. 4) together with runner 20 become cavities through which resinous material is fed via sprue 12. The resin thereafter flows through exit gate 26.

The assembled apparatus when viewed from the underside shows support blocks 16 and 18. Located therebetween is exit gate 26 defined by blocks 30 and 32. Material tested is extruded in a ribbon from exit gate 26.

Figure 3:
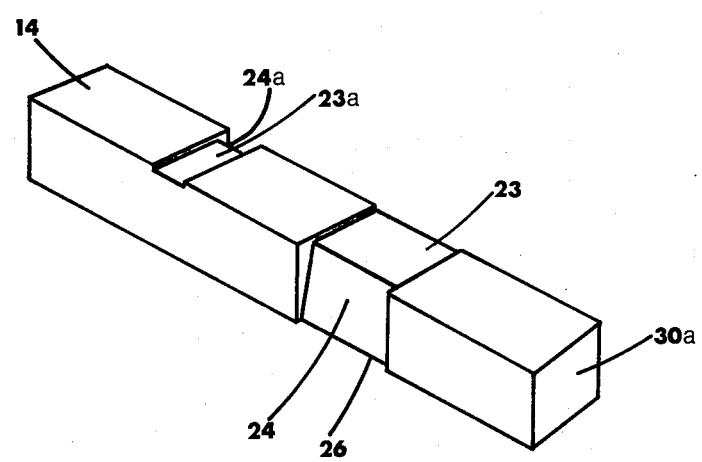
FIG. 3 shows a component block 30a of the apparatus of FIG. 1 defining two depressions thereby permitting two different uses of the same apparatus.

Block 30a (FIG. 3) defines two depressions, depression 23 and depression 23a. Also defined are sloping walls 24 and 24a. By placing block 30a in a reversed position depression 23a may be used with the described apparatus, thereby providing an exit gate having a second set of predetermined dimensions.

Figure 4:
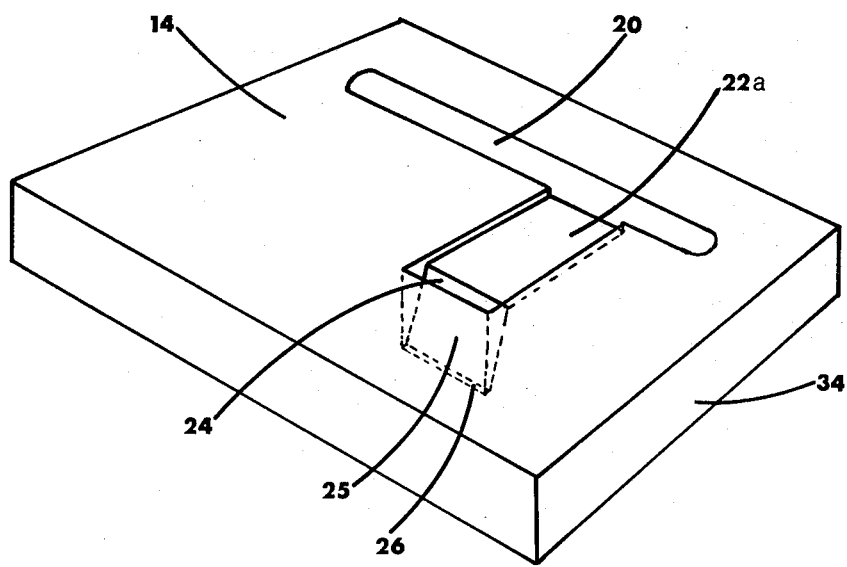
FIG. 4 shows a single block 34 which corresponds to blocks 28, 30 and 32 of FIG. 1 and defines depressions equivalent to the depressions defined by blocks 28, 30 and 32.

Though it is convenient to construct section 6 out of three separate blocks, it is possible to construct section 6 out of one block. FIG. 4 shows single block 34 which defines depressions 20, 22a and 25. In this instance depression 25 is defined by a sloping wall and a vertical wall narrowing to define exit gate 26 at the bottom of section 6.

Though an apparatus having depressions in one and three blocks has been described, it is possible to construct the same apparatus using a different number of blocks.

In Operation

The apparatus is used in conjunction with a transfer molding press. Material to be tested is placed in a heated chamber and brought to the appropriate temperature. A plunger is located above said chamber and at the appropriate time the plunger forces the molding material into the assembled apparatus through sprue 12 into runner 20. After filling runner 20 the molding material overruns and is forced into cavity 22 down sloping face 24 and out gate 26 wherefrom it is extruded as a thin ribbon having the cross-sectional area of gate 26.

There are a number of parameters which should be fixed or noted prior to testing in order to properly determine test results. The gate length may be varied up to about 2 inches, while the width may be from about 0.001 inch to about 0.15 inch. A preferred range is from about 0.01 inch to about 0.02 inch. The temperature of the test mold may vary from about 120° C to about 200° C. The temperatures of the test should be ideally recorded from one or more sensors permanently fixed or embedded in the apparatus. The plunger diameter is a factor which is preferably not varied. However, it should be noted and, if possible, a standardized diameter used. The plunger force should either be kept constant or variations in the pressure should be detected and recorded. The weight and the condition of the charge are also important. The material may be in the form of powder, loose granules, preformed blocks or pellets, or pre-heated and pre-formed blocks or pellets. These conditions should also be noted prior to the test.

A convenient way of recording certain information is to connect a linear transducer to the transfer plunger. A varying electrical signal from the transducer is fed into a recording instrument which effectively provides a graphical record. By this means a graph is drawn which clearly indicates the initial time of material flow, the beginning and end of the period of constant flow, the beginning and end of accelerated polymerization, (gelation), and the displacement as a function of time. With this information and by observation of the quantity and integrity of the extruded ribbon, it is possible to determine the following pertinent information:

1. Time until totally cured.
2. Time until gelation.
3. Time until the start of a uniform rate of flow.
4. Time until the end of uniform rate of flow.
5. Time until the molding composition enters the mold cavity.
6. Degree of compaction of composition prior to fusion.
7. Total amount of composition displaced.
8. Amount of composition displaced during the period of constant viscosity.
9. Rate of flow during period of constant viscosity.

A typical graph recorded by the Brabender technique. (American Laboratories, Sept. 1969, page 46,) indicates the following information by means of a rather indefinite curve, (see FIG. 5). The curve is divided into 7 "Phases" listed below:

1. Sample loading as measured by the initial surge of torque.
2. Initiation of melting.
3. Onset of fusion.
4. Fusion reflected by a peak and representing the fusion point of the material.
5. Heat softening, the period where there is a drop of apparent viscosity.
6. Stable flow.
7. Cross-linking or degradation.

Figure 5:
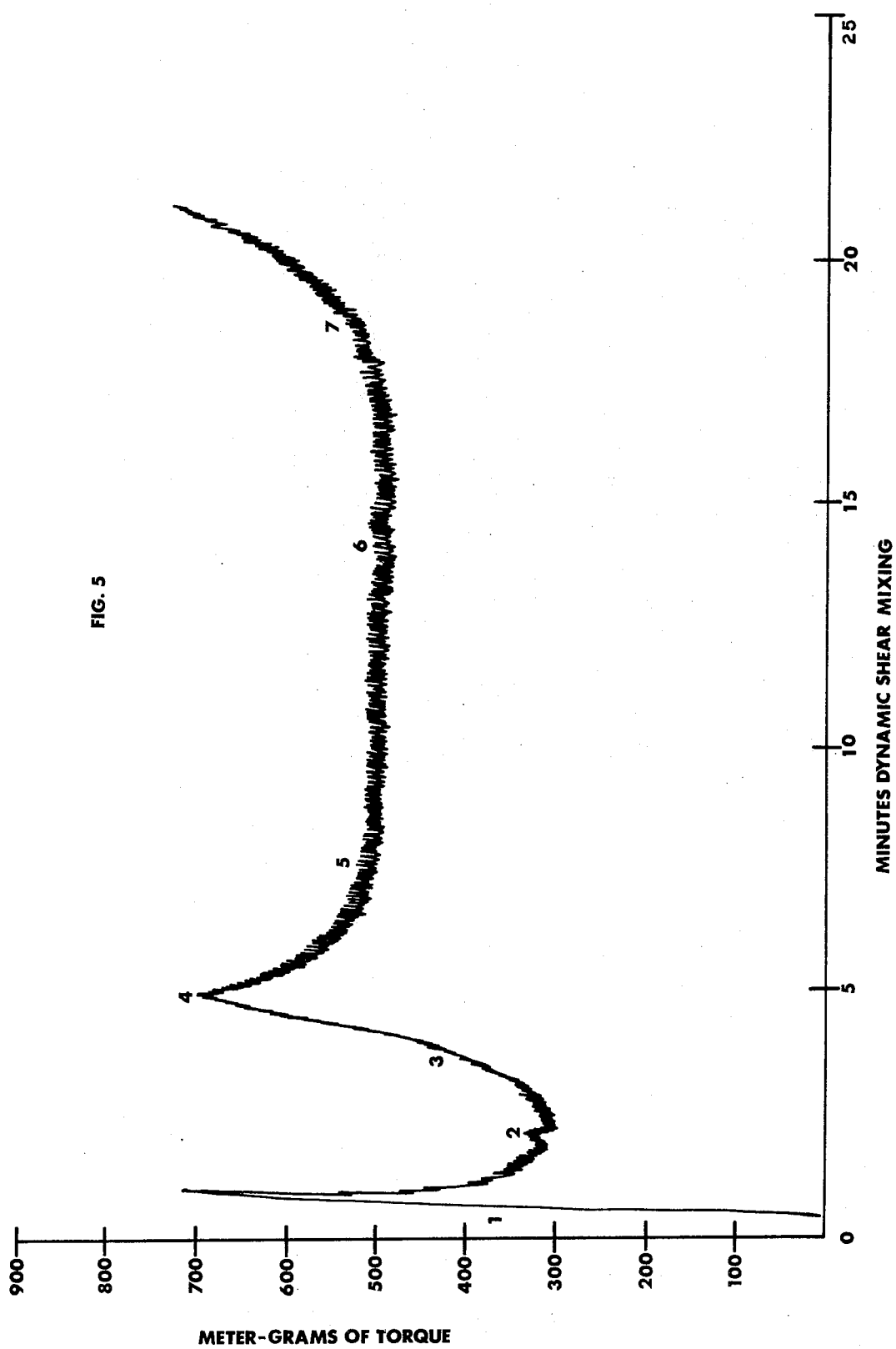
FIG. 5 shows a typical graph recorded by the Brabender testing technique.

For reasons of clarity the ordinate "Meter Grams of Torque" and the abscissa "Minutes Dynamic Shear Mixing" have been added to the graph in FIG. 5.

American Laboratories, Sept. 1969, page 47 shows a variety of kinds of curves which may be expected when using the Brabender technique. The wide variety of kinds of curves illustrates the problem in interpreting the individual Brabender curve.

Also, as can be seen from FIG. 5, differentiating between the above listed phases is a matter of individual judgement. It may be particularly difficult to determine the points defining phase 2 (initiation of melting), phase 3 (on-set of fusion), and phase 4 (the fusion point of the material being tested). Material tested with Brabender is subjected to conditions different from and unrelated to actual use conditions. Accordingly, various points on the Brabender curve indicate events different from the events during actual use.

The graph produced by the present invention reflects conditions and events closely resembling the conditions of actual use. In addition, curves produced by the present invention are relatively standardized and appear similar to each other. Different materials show differences in the exact location of various points on the curve and the angle of the slope of the curve.

Figure 6:
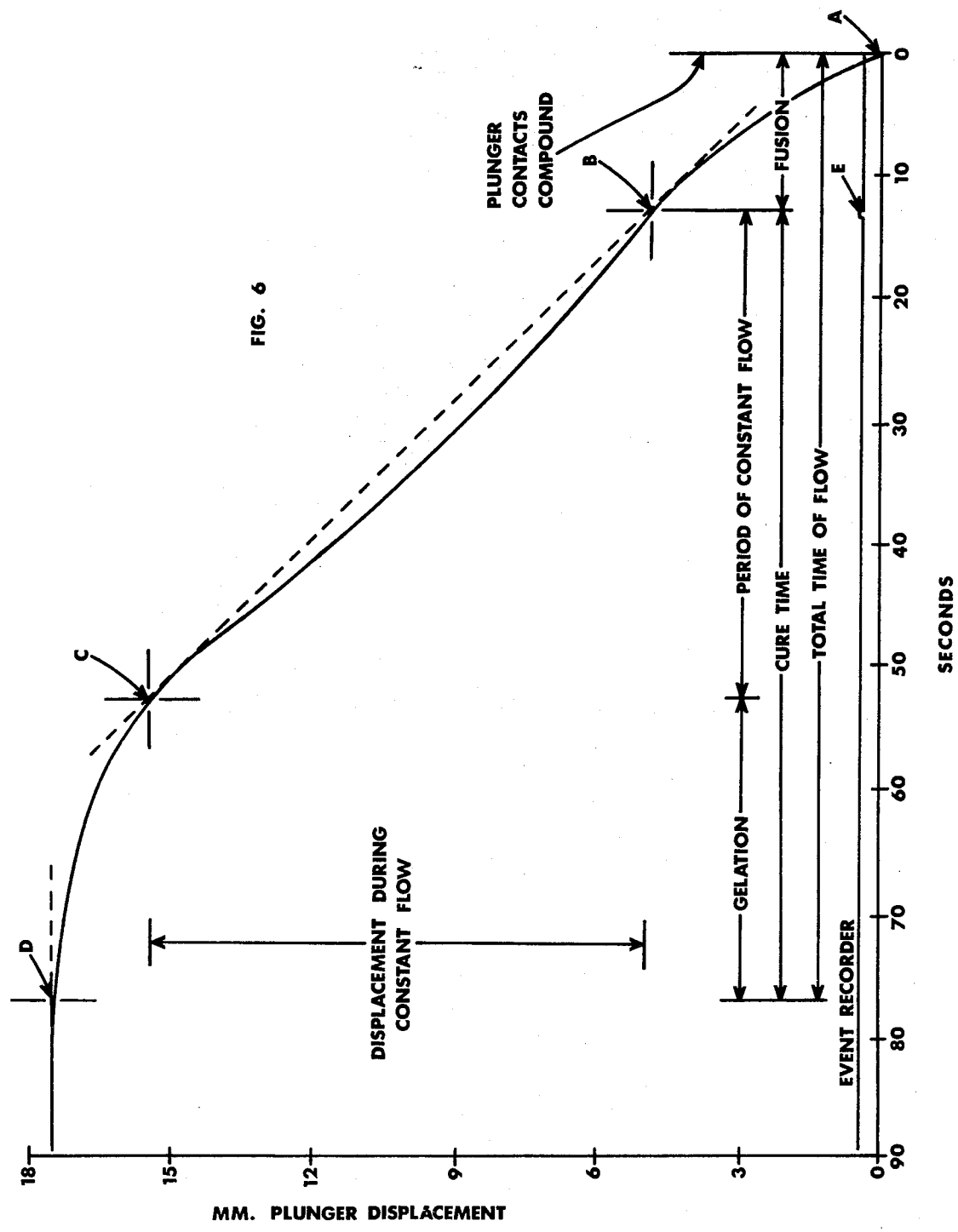
FIG. 6 shows a typical graph recorded by the invented testing technique.

There are five points, A, B, C, D, and E on the graph in FIG. 6 which mark particular events. The points are located in the following manner. The point where the graph begins to rise, point A, marks when the plunger contacts the test compound. A straight line is drawn tangential to the two convex curves at the initial and the terminating phases of the test. This results in a straight line indicating the general slope of the curve. The points at which the straight line and the curve of the graph start to diverge are point B (the beginning of the period of constant flow) and point C (the end of the period of constant flow). Point C also marks the beginning of accelerated cross-linking, or gelation. A second line is drawn horizontal and tangential to the top portion of the graph curve. The point at which the horizontal line and the curve join, point D, marks the end of gelation and the end of essentially all the cure. Cure time can be determined as the period between points B and D while the time of total flow is from point A to point D.

An event recorder line is also located on the graph. The instant that the test material begins to flow through the gate can be signaled by, e.g., a photoelectric cell or other method and may be recorded as point E.

Figure 7:
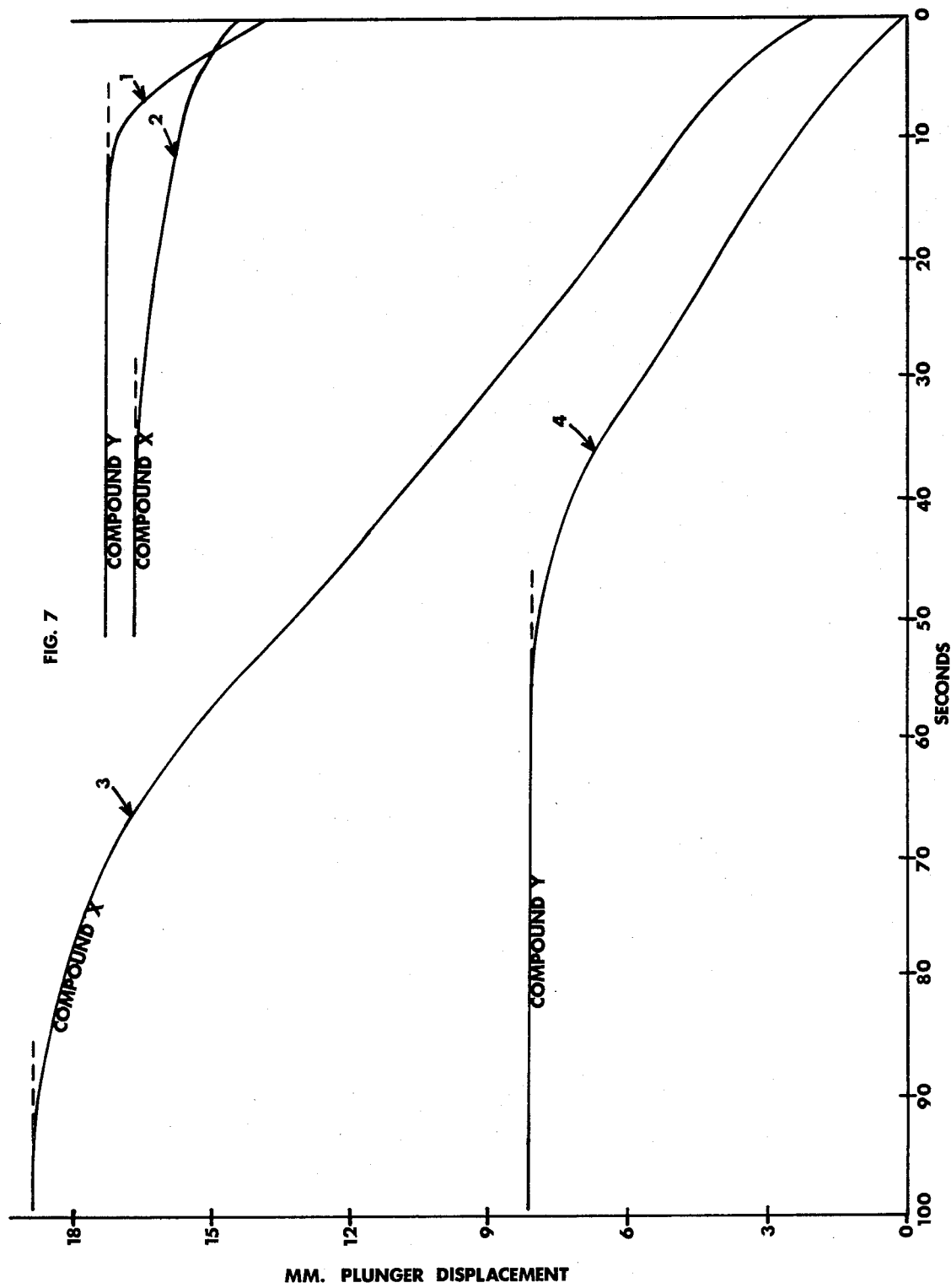
FIG. 7 shows graphs recorded from two samples of material, each sample tested by the invented tester and by a spiral flow tester.

FIG. 7 shows a comparison of graphs produced using two different products identified on the graph as X and Y respectively, each as tested by two different methods, i.e., spiral flow and the present process. A linear transducer was connected to both a spiral flow test apparatus and to the invented test apparatus, and the results were recorded as shown in FIG. 7. The spiral flow test (curves 1 and 2) yielded curves which indicate that composition X has less displacement than composition Y and that both have a relatively short cure time. The apparatus of the present invention yielded curves 3 and 4 which indicate, contrary to the spiral flow method that composition X has a much greater displacement than composition Y. Also curves 3 and 4 indicate that composition X has almost twice the length of cure time as does composition Y. During commercial molding operations, composition X was actually shown to have approximately twice the displacement and length of cure time as composition Y. Thus it is demonstrated that the results of a spiral flow test can provide misleading information about use characteristics of molding materials. However, the results from the present invention illustrate that information derived therefrom is almost identical to actual use conditions.

What is claimed is:

1. An apparatus for testing the performance characteristics of a thermo-setting resinous composition said apparatus comprising at least two sections which cooperatively engage and are adapted to receive a fluid resinous molding material through an aperture in one section and to permit said molding material to exit from the second section, said apparatus comprising:
   I. a first section having an aperture extending therethrough, and
   II. a second section having
      a. a trough-like runner, said trough-like runner at right angles to an communicating with said aperture when said first and said second sections are cooperatively engaged,
      b. a shallow two-ended rectangular depression, and
      c. a deep depression narrowing to define an exit gate having a gap of pre-determined dimensions,
   one end of said shallow rectangular depression communicating with said runner and the other end of said shallow rectangular depression communicating with said deep depression.

2. An apparatus for testing the performance characteristics of a thermo-setting resinous composition said apparatus comprising at least two sections which cooperatively engage and are adapted to receive fluid resinous molding material through an aperture in one section and to permit said molding material to exit from the second section, said apparatus comprising:
   I. a first section defining a flat surface portion with a pair of opposed sides extending downwardly therefrom, said flat surface having an aperture extending therethrough, and
   II. a second section defining a flat surface portion in which there are a series of depressions which, when said first and said second sections are cooperatively engaged form cavities, said depressions including:
      a. a trough-like runner at right angles to and communicating with said aperture,
      b. a shallow rectangular depression lying in the surface of said second section in a position normal to said runner, said rectangular depression having two ends, and
      c. a deep depression which extends through the depth of said second section normal to said shallow rectangular depression said deep depression narrowing to define an exit gate having a gap of predetermined dimensions,
   one end of said shallow rectangular depression communicating with said runner and the other end of said shallow rectangular depression communicating with said deep depression.

3. The apparatus as in claim 2 wherein said second section comprises two blocks, the first said block containing
   a. said trough-like runner,
   b. said shallow rectangular depression,
   c. a first portion of said deep depression, and
   d. a first portion of said exit gate,
   the second said block containing:
   a. a second portion of said deep depression, and
   b. a second portion of said exit gate.

4. The apparatus of claim 2 wherein said second section is made up of three blocks, the first block containing:
   a. said trough-like runner, and
   b. a first portion of said shallow rectangular depression,
   the second block containing:
   a. a second portion of said shallow rectangular depression,
   b. a first portion of said deep depression, and
   c. a first portion of said exit gate,
   the third block containing:
   a. a second portion of said deep depression, and
   b. a second portion of said exit gate.

5. The apparatus of claim 2 wherein said second section is mounted on two spaced apart support bases, said bases being located on opposite sides of said exit gate.

6. The apparatus of claim 2 wherein the exit gate has the dimensions of from about 0.25 inch to about 2 inches in length and from about 0.001 inch to about 0.15 inch in width.

7. An apparatus for testing the performance characteristics of a thermo-setting resinous composition said apparatus comprising a mold having at least two sections adapted to be held together to form a mold cavity comprising:
   I. a first section having an aperture therethrough, and
   II. a second section comprising:
      a. a runner, said runner communicating with and substantially perpendicular to said aperture,
      b. a shallow cavity, said shallow cavity having two ends, and
      c. a deep cavity narrowing to form an exit gate, the first end of said shallow cavity communicating with and normal to said runner at a point intermediate the ends of said runner and the second end of said shallow cavity communicating at right angles with said deep cavity.

8. A method for testing the performance characteristics of a thermo-setting resinous composition comprising heating said resin to render it mobile, forcing the mobile resin to flow in a stream through a series of cavities, the last of which cavities defines an exit gate of relatively narrow gap dimensions, extruding said resin through said exit gate, and recording the resin displacement per unit of time.

9. The method of claim 8 wherein the dimensions of said exit gate are from about 0.25 inch to about 2 inches in length and from about 0.001 inch to about 0.15 inch in width.

* * * * *